United States Patent
Kan et al.

(10) Patent No.: US 7,991,821 B2
(45) Date of Patent: Aug. 2, 2011

(54) SYSTEM AND METHOD FOR PLANNING A WIRELESS COMPUTER NETWORK USING NETWORK PERFORMANCE CONTOUR OVERLAYS

(75) Inventors: Siew Leong Kan, Singapore (SG); Khoon Wee Ang, Singapore (SG)

(73) Assignee: Nanyang Polytechnic, Singapore (SG)

( * ) Notice: Subject to any disclaimer, the term of this patent is extended or adjusted under 35 U.S.C. 154(b) by 657 days.

(21) Appl. No.: 10/576,340

(22) PCT Filed: Nov. 19, 2004

(86) PCT No.: PCT/SG2004/000377
§ 371 (c)(1), (2), (4) Date: Apr. 18, 2006

(87) PCT Pub. No.: WO2005/069176
PCT Pub. Date: Jul. 28, 2005

(65) Prior Publication Data
US 2007/0061442 A1  Mar. 15, 2007

(30) Foreign Application Priority Data

Jan. 14, 2004 (SG) ............................ 200401177-1

(51) Int. Cl.
*G06F 15/173* (2006.01)
(52) U.S. Cl. ........................................... 709/200
(58) Field of Classification Search ........... 709/224, 709/200
See application file for complete search history.

(56) References Cited

U.S. PATENT DOCUMENTS

| | | | | |
|---|---|---|---|---|
| 5,701,161 | A * | 12/1997 | Williams et al. | 348/468 |
| 6,434,442 | B1* | 8/2002 | Kawamoto | 700/98 |
| 7,054,296 | B1* | 5/2006 | Sorrells et al. | 370/338 |
| 7,110,756 | B2* | 9/2006 | Diener | 455/423 |
| 7,301,926 | B1* | 11/2007 | Dietrich et al. | 370/338 |
| 7,313,113 | B1* | 12/2007 | Hills et al. | 370/332 |
| 2001/0012990 | A1* | 8/2001 | Zimmerman et al. | 703/13 |
| 2001/0046066 | A1* | 11/2001 | Ueda et al. | 358/1.15 |
| 2003/0212588 | A1* | 11/2003 | Brown | 705/8 |
| 2003/0212754 | A1* | 11/2003 | Brown | 709/217 |
| 2003/0212780 | A1* | 11/2003 | Brown | 709/223 |
| 2003/0216949 | A1* | 11/2003 | Kram et al. | 705/5 |
| 2004/0030741 | A1* | 2/2004 | Wolton et al. | 709/202 |
| 2004/0229623 | A1* | 11/2004 | Rappaport et al. | 455/446 |
| 2006/0055793 | A1* | 3/2006 | Adler et al. | 348/211.99 |
| 2006/0229896 | A1* | 10/2006 | Rosen et al. | 705/1 |
| 2009/0043666 | A1* | 2/2009 | Malik et al. | 705/26 |

* cited by examiner

*Primary Examiner* — Wing F Chan
*Assistant Examiner* — Tesfay Yohannes
(74) *Attorney, Agent, or Firm* — Pyprus Pte Ltd

(57) ABSTRACT

The present invention makes use of a database of existing site surveys of a variety of locations and sites producing a plurality of test-bed templates and also a variety of simulation models of actual layouts and sites producing a plurality of simulation templates. The simulation templates and test-bed templates are used to find a best match to a new layout for planning a new wire-less computer network. Data comprising of performance parameters from the templates are used to generate network performance contour overlays that may be superimposed on the new layout.

5 Claims, 4 Drawing Sheets

SYSTEM AND METHOD FOR PLANNING A WIRELESS COMPUTER NETWORK USING NETWORK PERFORMANCE CONTOUR OVERLAYS

FIELD OF THE INVENTION

The present invention generally relates to methodologies for planning a wireless computer network. In particular, the invention relates to a method and system for planning a wireless computer network for a predetermined layout using a combination of network performance contour overlays.

BACKGROUND OF THE INVENTION

Wireless computer networking has become one of the newest options for companies implementing networking in the office environment. Wireless Local Area Networks (WLAN) provides small offices ease of mobility and networking without the traditional need for hard-wiring network cables from servers to clients or even peer to peer. For such small offices, a wireless computer network with a single wireless access point may well be sufficient.

However, implementing of wireless computer networks for a large office with a large floor space and a corresponding high number of users, presents a different set of problems. Several wireless access points may well be needed in the wireless computer network to allow every member of the office to be linked wirelessly.

Implementing such multi access point wireless computer network requires extensive planning by experienced and skilled professionals. Some of the design factors affecting design considerations are: number and location of the wireless access points, the number of users, transmission power and frequency channels used. There is also a need to know the applications to be supported by the wireless computer network. Some non limiting examples are: FTP, email and Video Streaming applications. Some of the key performance parameters that can be used to gauge the performance of the wireless computer network are: RF signal strength, Signal to Noise (S/N) Ratio, throughput, network delay and applications response time.

It is virtually impossible to predict the performance of such wireless networks especially in offices where structural elements and constraints of the building such as pillars and walls are predominant. More often than not, a physical site survey has to be conducted by an experienced and skilled site surveyor using wireless surveying equipment prior to the planning of the wireless computer network.

Such a survey disadvantageously requires expensive equipment and is time consuming. There is also an over-reliance on personal experience and skills of the site surveyor conducting the site survey to obtain suitable layouts which could satisfy the performance and design criteria of the wireless computer network to be planned.

Upon completion of the site survey, the results from the site survey which comprises values of performance parameters measured from some predetermined locations are analyzed. The analysis of these network performances together with other non-performance related design factors are then used to plan a wireless network in accordance with the requirements and structural layout of the desired site. These predetermined locations to be surveyed are disadvantageosuly at the discretion of the site surveyor and still very much dependent on his experience and judgement.

It can thus be seen that there exists a need for a simple and robust way for a method and system for using network performance contour overlays for the planning of a wireless computer network that can overcome the disadvantages of the existing prior art.

SUMMATY OF THE INVENTION

The present invention seeks a method and system for using network performance contour overlays for planning a wireless computer network.

Accordingly, in one aspect, the present invention provides, a wireless computer network planning system for planning a wireless computer network having a predetermined layout, the system comprising: a template database for storing a plurality of templates; a template identifier coupled to the template database, the template identifier for receiving search terms and for searching the template database for matching templates; a network performance contour overlay generator for creating network performance contour overlays from performance parameters extracted from the matching templates; a network performance contour overlay superimposer for receiving the predetermined layout and for superimposing at least one of the network performance contour overlays onto the predetermined layout producing a superimposed layout.

In another aspect, the present invention provides, a method for planning a wireless computer network for a predetermined layout, the method comprising the steps: receiving the predetermined layout and search terms; searching a template database for suitable matching templates based on the search terms; creating at least one network performance contour overlay from the matching templates; and superimposing the at least one network performance contour overlay onto the predetermined layout.

BRIEF DESCRIPTION OF THE DRAWINGS

A preferred embodiment of the present invention will now be more fully described, with reference to the drawings of which.

DETAILED DESCRIPTION OF THE DRAWINGS

A method and system for using network performance contour overlays for planning a wireless network with a preferred embodiment is described. In the following description, details are provided to describe the preferred embodiment. It shall be apparent to one skilled in the art, however that the invention may be practiced without such details. Some of the details may not be described at length so as not to obscure the invention.

The present invention provides some means to circumvent the disadvantages of over-reliance on personal experience and judgement in planning wireless computer networks. It uses compilations of network performance results, in the form of contours overlays derived from either computer simulations or test-beds measurements, to check for feasibility before actual hardware implementation of the wireless network is performed.

The present invention makes use of a database of existing and past site surveys of a variety of locations and sites. These site surveys are used to produce a plurality of test-bed templates. A variety of simulation models of actual and fictitious layouts are also utilized to produce a plurality of simulation templates. The simulation templates and test-bed templates are used for matching a best match of a new proposed layout for a wireless computer network having a predetermined layout. Data comprising of performance parameters from the templates are used to generate network performance contour overlays that may be superimposed on the predetermined layout for planning purposes.

Figure 2:
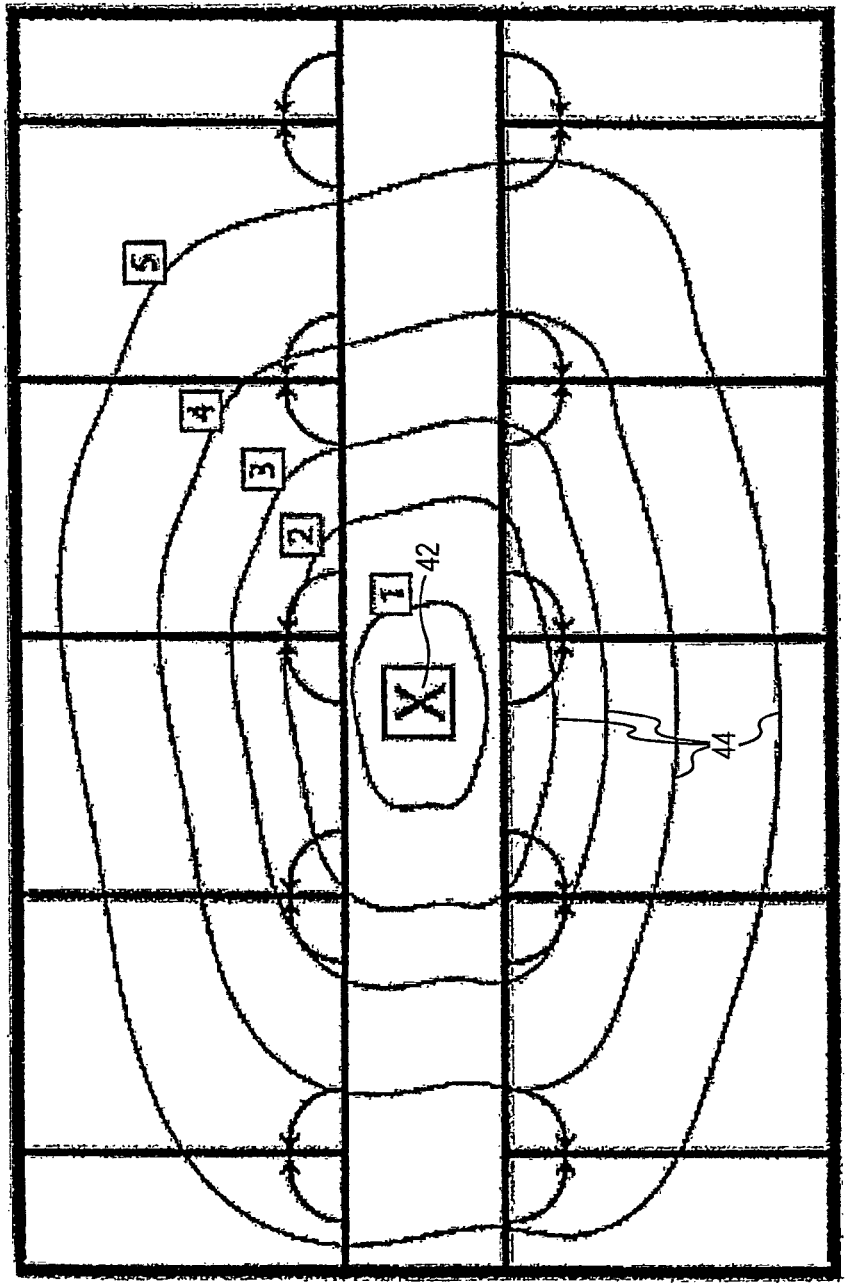
FIG. 2 illustrates an example of a network performance contour overlay representing response time of data transfer from a wireless access point in accordance with the present invention.

Referring to FIG. 2, an example of a network performance contour overlay 40 in accordance with the present invention is shown. The network performance contour overlay 40 comprises a representation of an access point 42 as indicated by the X marking and a plurality of contour lines 44 which indicates the magnitude of a selected network performance parameter at the distance of the contour line from the access point 42. The example of FIG. 2 shows the response time of a data packet of size 4 kilobytes at various distances from the wireless access points marked X. Locations with the same magnitude of response time is graphically linked to form contour lines 44 which are individually labelled as boxes 1 to 5; where for example at box 3 the average response time is 80 milliseconds.

While the above example is of a network performance contour overlay 40 of response time, it is clear that any of the various performance parameters of the wireless computer network can be represented into a network performance contour overlay 40.

Figure 1:
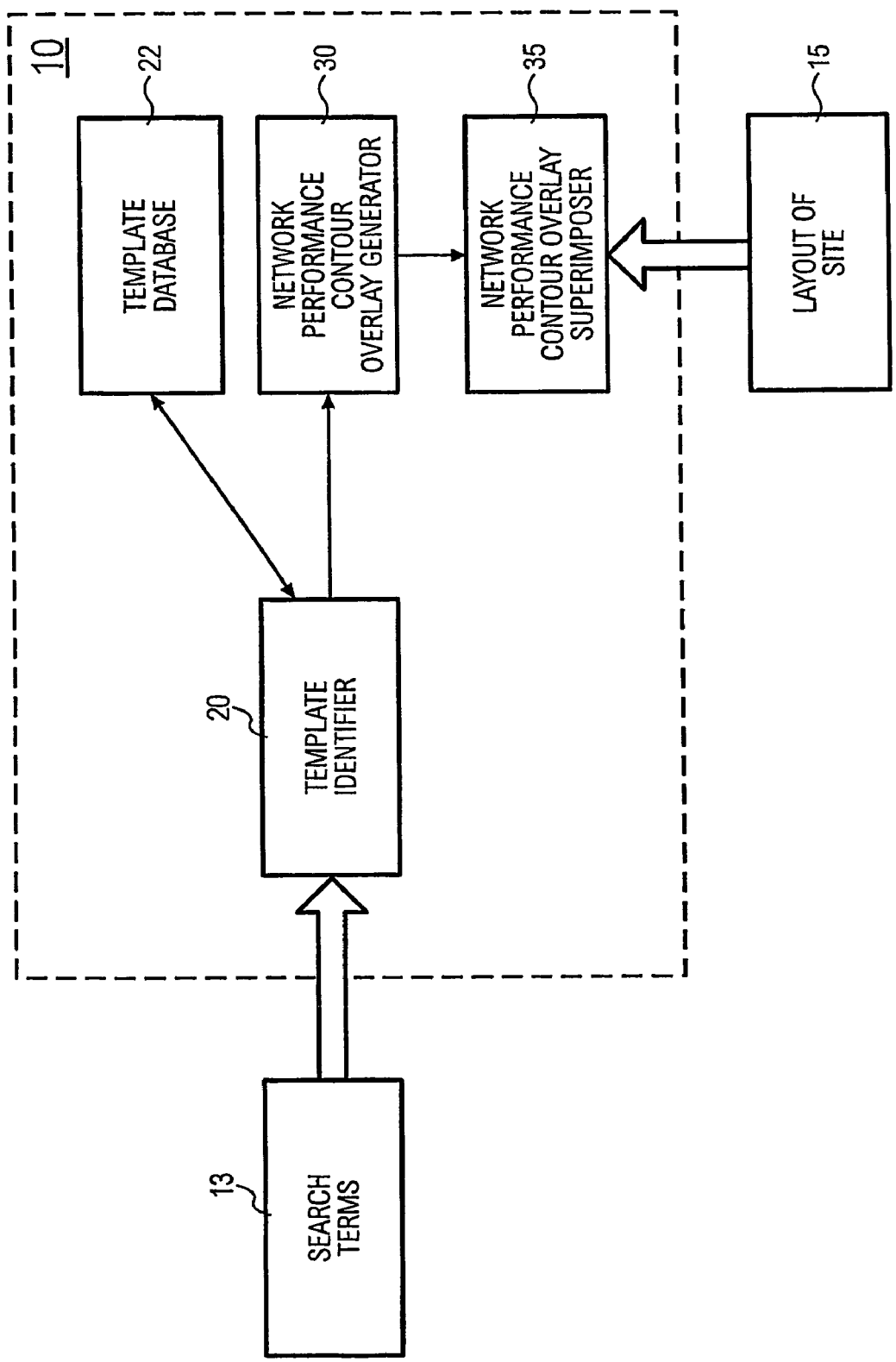
FIG. 1 illustrates a system for using network performance contour overlays for planning a wireless computer network in accordance with the present invention.

Referring to FIG. 1, a wireless computer network planning system 10 in accordance with the present invention comprises a template identifier 20 for receiving search terms 13. The template identifier 20 is also for searching a coupled template database 22 using the search terms 13. The template database 22 is for storing a plurality of simulation templates and test-bed templates. The simulation template and the test-bed templates are respectively stored in the simulation template database and the test-bed template database. The simulation template database and the test-bed template database are correspondingly found in the template database 22.

The search terms 13 may be user defined and may be in accordance with certain design factors of which some non limiting examples being layout area, number of access points and number of users.

The template identifier 20 is also coupled to a network performance contour overlay generator 30 which is for generating network performance contour overlays of performance parameters extracted from the templates in the template database 22. The variety of different performance parameters would thus result in a variety of and a plurality of network performance contour overlays 40.

The network performance contour overlay generator 30 is further coupled to a network performance contour overlay superimposer 35. The network performance contour overlay superimposer 35 receives an input of a predetermined layout 15 of the site which a wireless computer network is desired. The network performance contour overlay superimposer 35 further receives the network performance contour overlays 40 from the network performance contour overlay generator 35 and superimposes the network performance contour overlays 40 onto the predetermined layout 15 to produce superimposed layouts.

This superimposed layouts can then be used in the planning and the implementation of the computer wireless network according to the provided predetermined layout 15. The superimposed layout will have at least one network performance contour overlay 40 superimposed onto the predetermined layout 15. While it may be desirable to have a few different network performance contour overlays 40 superimposed, this is only limited by the ability of the user to comprehend and distinguish between the different network performance contour overlays 40 superimposed.

The system 10 may further comprise some displaying means such as a computer monitor or LCD display for displaying the superimposed layouts. Alternatively, the system may further comprise some reproduction means such as a printer for printing the superimposed layouts onto some media means. Some non limiting examples of such media means may be paper and transparencies.

The wireless computer network planning system 10 may be based on a computer running software programs that provide some desired functionality. Typically, the computer includes a processor that is coupled to access and control the operation of a wireless network planning system 10. In addition, the processor is coupled to random access memory, read-only-memory, one or more hard disk drives or memory storage means, and some form of user interface The operation of the computer is known to one skilled in the art, and will not be further elaborated here, except where such details assist in the description of the present invention.

Figure 3:
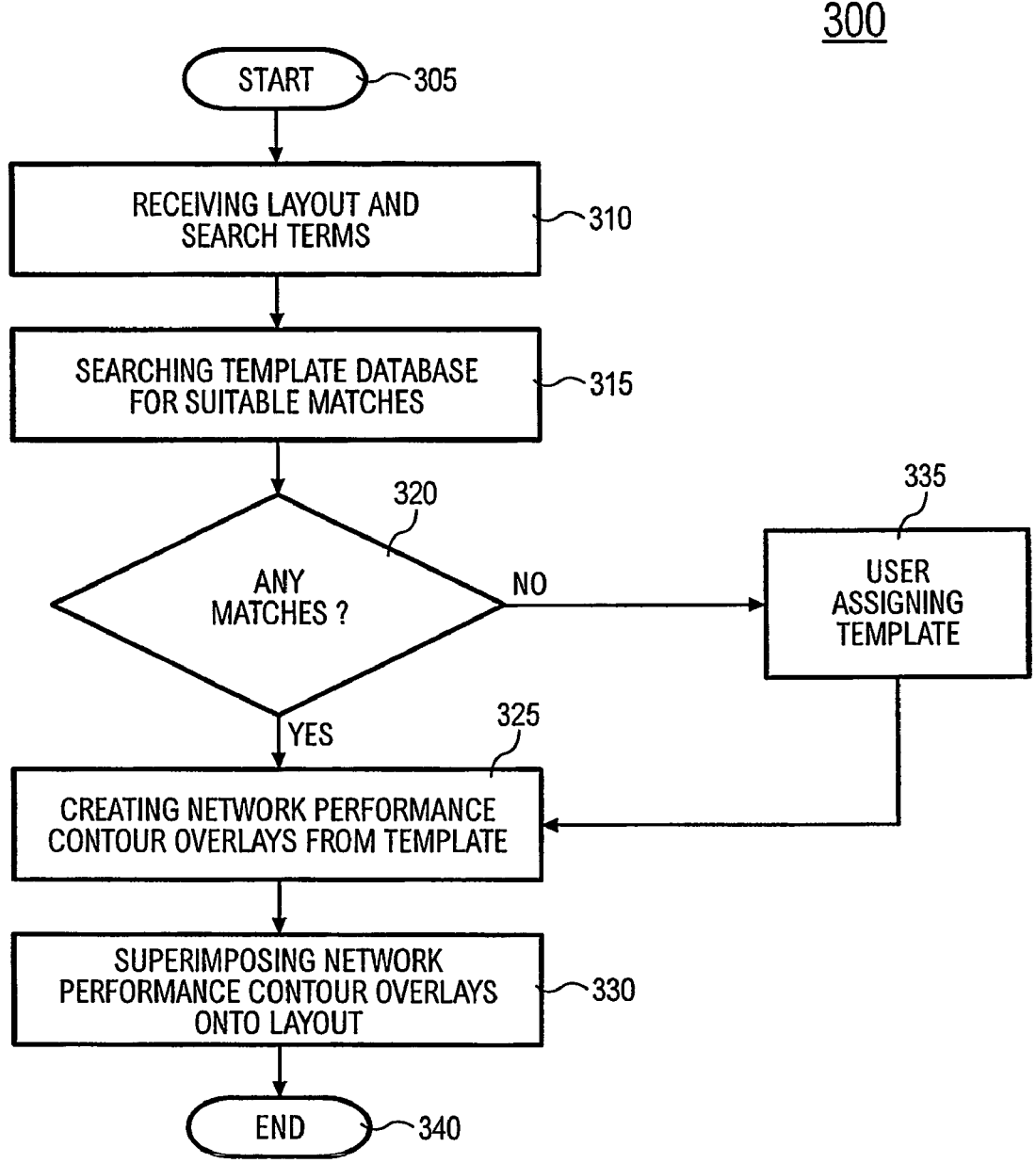
FIG. 3 illustrates a flowchart for a method for using network performance contour overlays for planning a wireless computer network in accordance with the present invention.

Referring to FIG. 3, a method for using network performance contour overlays for planning a wireless computer network starts with the step of receiving 310 a predetermined layout 15 and the requirements of the wireless computer network. The predetermined layout 15 would likely be a plan view or drawing of the grounds and location where the wireless computer network is desired. The requirements of the wireless computer network are the design factors and sometimes may further comprise certain performance parameters.

Next, the step of searching 315 the template database 22 for a suitable match is performed. The search attempts to match the predetermined layout 15 and the requirements to the plurality of templates stored in the template database 22. If there are no matches, user intervention is required and a template may be chosen arbitrarily or selectively and assigned 335.

The matched or assigned template is then further used to create 325 a plurality of network performance contour overlays 40. Next, at least one of the network performance contour overlays 40 are then superimposed 330 onto the layouts for planning of the wireless computer networks.

The resulting superimposed layouts may be represented graphically on a computer monitor or LCD display or be printed out onto any of a variety of media means. Some non limiting examples of such media means may be paper and transparencies.

Figure 4:
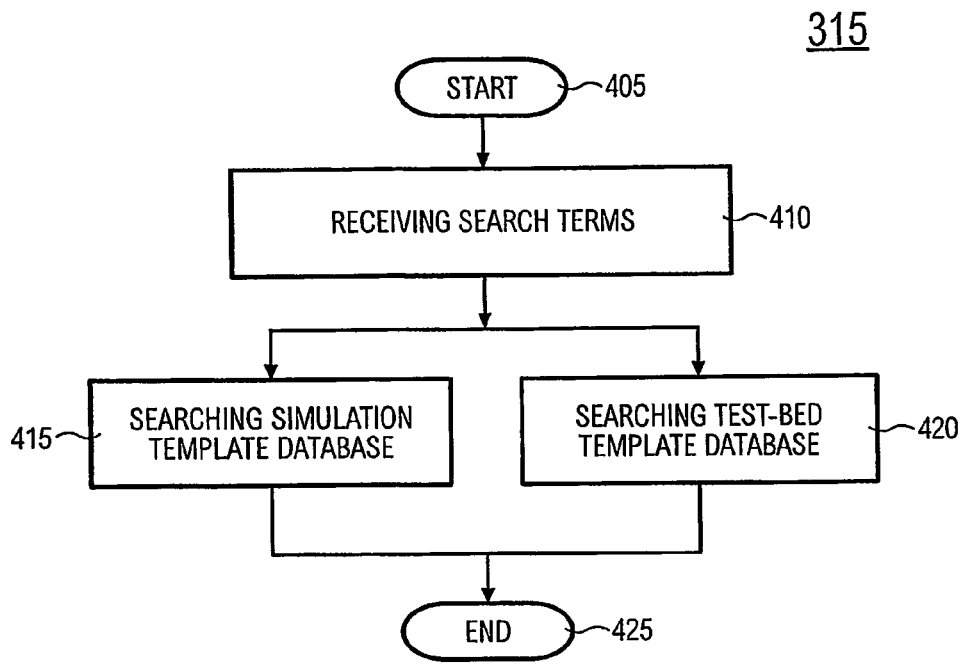
FIG. 4 illustrates a flowchart for the searching step of FIG. 3.

Referring to FIG. 4, the step of searching 315 the template database 22, further comprises the step of receiving 410 search terms 13. The search terms 13 may be user defined and may be in accordance with certain design factors of which some non limiting examples being layout area, number of access points and number of users.

Following which, the step of searching 415 the simulation template database and the step of searching 420 the test-bed template database is performed. The simulation template database and the test-bed template database are all stored in the template database 22.

Figure 5:
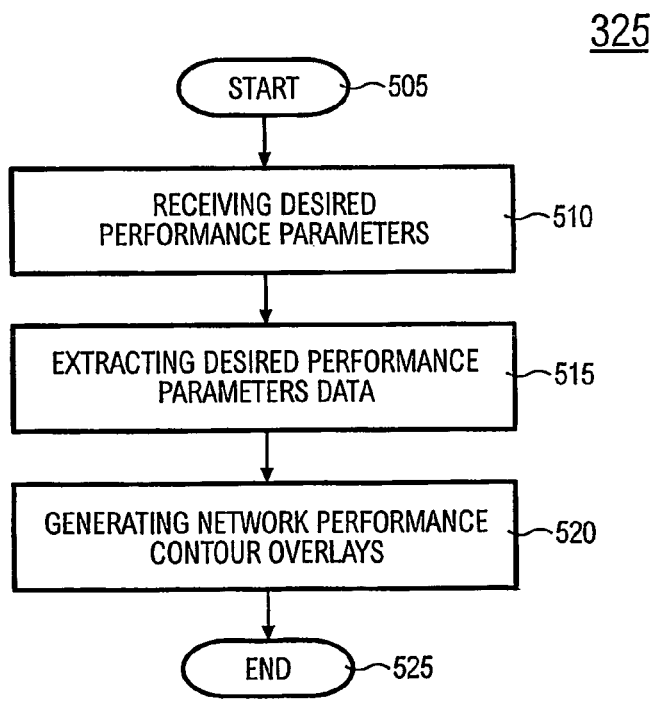
FIG. 5 illustrates a flowchart for the creating contour overlays step of FIG. 3.

Referring to FIG. 5, the step of creating 325 network performance contour overlays 40 starts with the step of receiving 510 desired performance parameters for generating of network performance contour overlays 40. The desired performance parameters is usually decided or predetermined by the user. Alternatively, a predetermined number of default performance parameters may be used first and additional performance parameters added later.

Next, the step of extracting 515 the desired performance parameters is performed. The desired performance parameters data is stored in the templates stored in the template database 22. Following which the extracted data is used to generate 520 the network performance contour overlays 40 based on the desired performance parameters.

It will be appreciated that various modifications and improvements can be made by a person skilled in the art without departing from the scope of the present invention.

The invention claimed is:

1. A wireless network simulation system for simulating wireless network performances for planning a wireless network over a predetermined layout, said system comprising:
   - a template database that comprises a plurality of test-bed templates produced by using a database of existing and past site surveys of a variety of locations and sites, and a plurality of simulation templates produced by using a variety of simulation models of actual and fictitious layouts;
   - a template identifier operable to access the template database, wherein the template identifier is adapted to receive search terms and search through the template database for identifying matching templates from the template database based on said search terms, wherein the search terms include design factors relating to the predetermined layout;
   - a wireless network performance contour overlay generator operable to receive desired performance parameters and process the matching template based on the design factors of the wireless network and create wireless network performance contour overlays from the desired performance parameters extracted from said matching templates; and
   - a wireless network performance contour overlay superimposer operable to receive said predetermined layout and superimpose each of said wireless network performance contour overlays onto said predetermined layout to produce superimposed layouts; thereby a suitable superimposed layout is selected for implementation.

2. The system in accordance with claim 1, further comprising a display means for displaying said superimposed layout.

3. The system in accordance with claim 1, further comprising a reproduction means for printing said superimposed layout onto some media means.

4. A method for simulating wireless network performance for planning a wireless network over a predetermined layout, said method comprising the steps:
   a. receiving the predetermined layout and search terms, wherein the search terms include design factors relating to the predetermined layout;
   b. accessing a template database that comprises a plurality of test-bed templates produced by using a database of existing and past site surveys of a variety of locations and sites and a plurality of simulation templates produced by using a variety of simulation models of actual and fictitious layouts;
   c. identifying matching templates from the template database, based on said search terms;
   d. creating network performance contour overlays from the performance parameters extracted from said matching templates based on the design factors; and
   e. superimposing the network performance contour overlays onto said predetermined layout;
   wherein
   the step d further comprises:
   d1. receiving desired performance parameters;
   d2. extracting said desired performance parameters data from said matching templates in said template database; and
   d3. generating network performance contour overlays from said desired performance parameters data.

5. The method in accordance with claim 4, after step e, comprising step f:
   Assigning a matching template if step e produces no matching template.

* * * * *